Patented Sept. 23, 1930

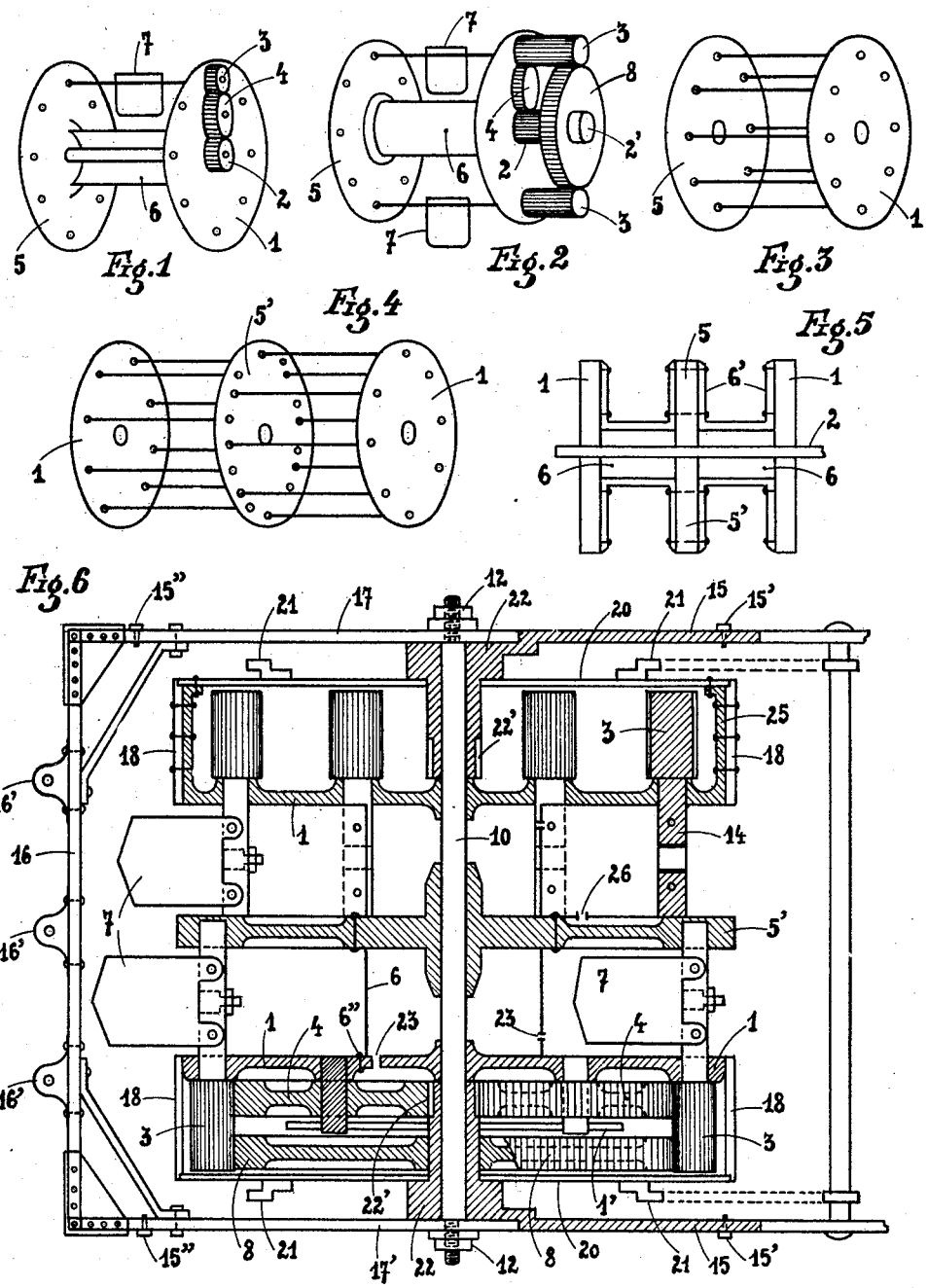

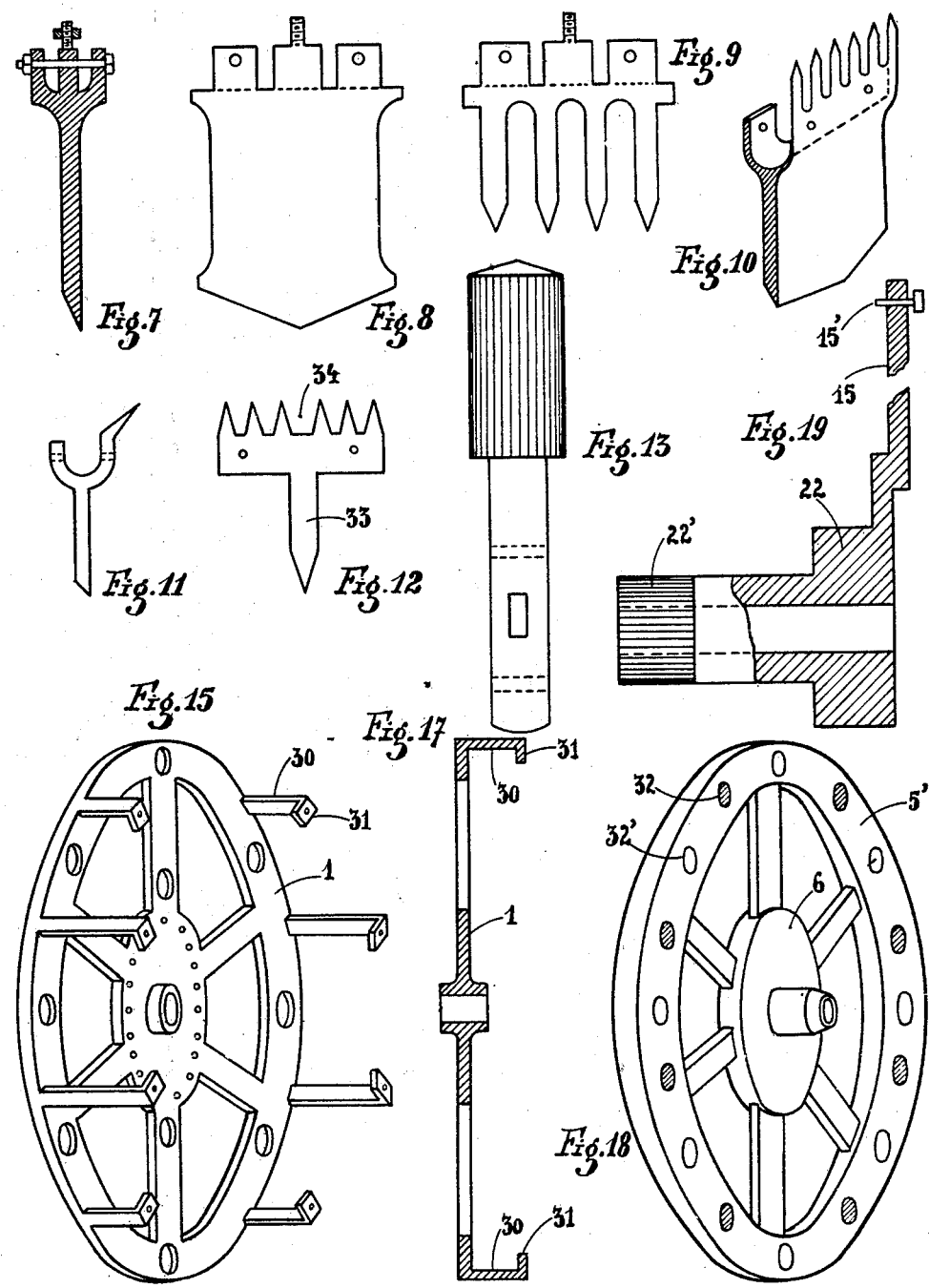

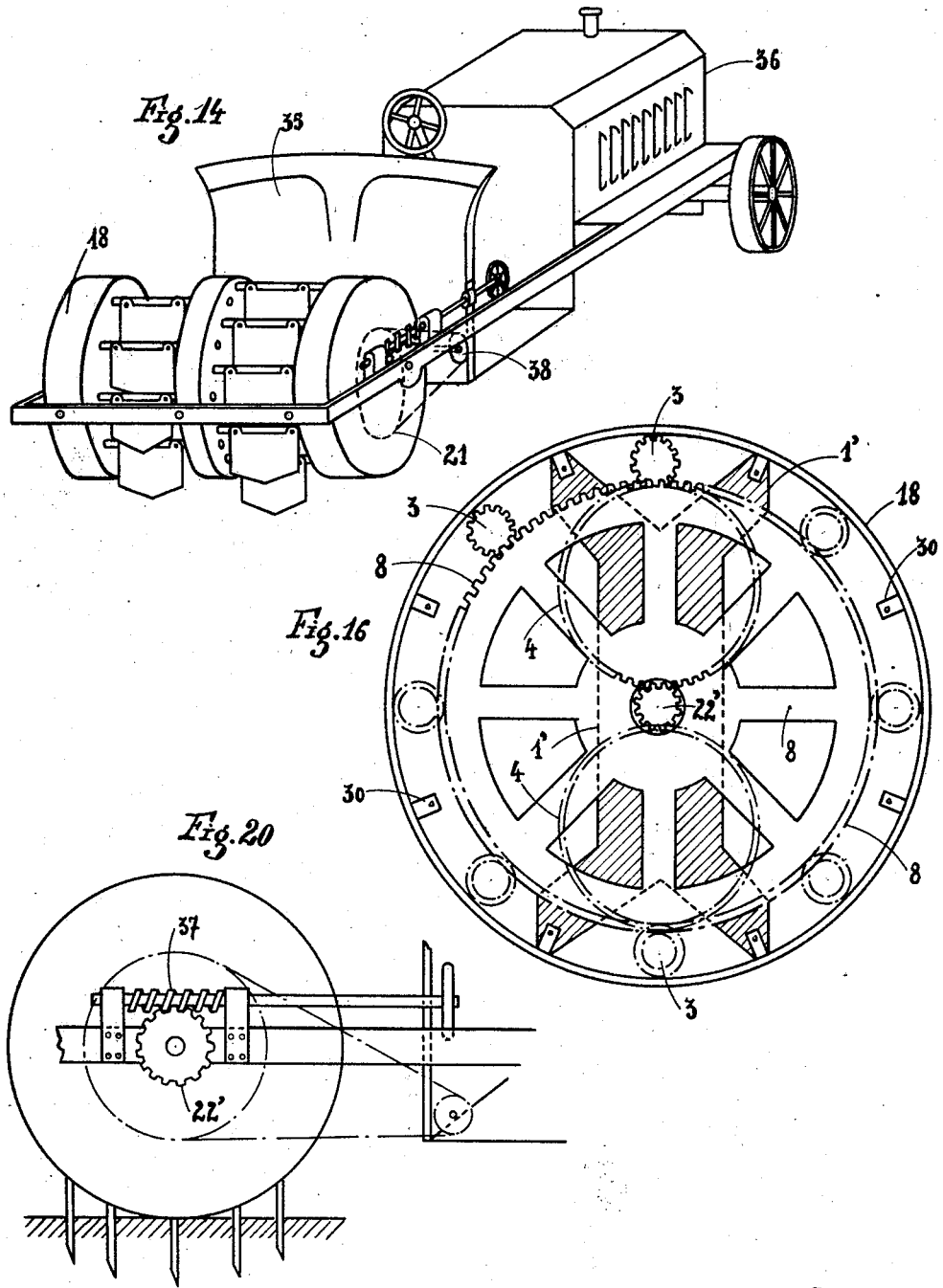

1,776,486

UNITED STATES PATENT OFFICE

CHARLES BOUCHÉ, OF BRUSSELS, BELGIUM

MECHANICAL TRACTOR

Application filed March 3, 1927, Serial No. 172,517, and in Belgium January 29, 1927.

My present invention relates to mechanical tractors such as agricultural tractors and in general to all tractors designed to move on roads, soft uneven grounds, ice and the like, and which are moved forwardly on roads by means of wheels, while on soft or uneven grounds (ploughed up grounds) or on ice such forward movement is secured by means of driving members engaging the ground to form a number of successive points of resistance.

The main feature of my invention is the provision of a tractor member in which the driving members successively forming abutments or resistances in the ground are carried by the wheel or wheels of the tractor in such a way that in all positions they will always remain parallel to themselves.

Another feature of my invention is the arrangement of said driving members in such a way that for the forward movement on roads they may be withdrawn by a single operation, at the same time remaining parallel to themselves.

A further feature of my invention is the particular bilateral arrangement of the driving members whereby for a given tractor dimension and prescribed length of said member, the number of the latter may be increased in such a way that the tractor will be moved forwardly in a uniform way without shocks and supplemental expense of power.

The invention is illustrated in the accompanying drawings, in which:

Fig. 1 is a perspective view in diagrammatic form showing the end disk sections and sleeve connector of a wheel, with a blade in position therebetween and the operating means at one end of the wheel.

Fig. 2 is a similar view showing the means for utilizing a plurality of blade carrying shafts and maintaining them against revolution during the rotation of the wheel.

Fig. 3 is a diagrammatic perspective view showing a plurality of blade carrying shafts arranged between the disks forming the wheel.

Fig. 4 is a similar view showing two wheel sections united to form a single wheel element, the blade carrying shafts of one of the separate wheel sections being offset from the blade carrying shafts of the other wheel section.

Fig. 5 is a diagrammatic elevation of the form of wheel shown in Fig. 4 and illustrating more particularly the manner in which the wheel sections are secured together.

Fig. 6 is an end view of a practical embodiment of the invention, partly in section.

Fig. 7 is an end view of a driving blade.

Fig. 8 is a front elevation of the same.

Fig. 9 is an end elevation of a modified form of blade.

Fig. 10 is a perspective view of a modified form of blade.

Fig. 11 is an end view of the blade shown in Fig. 10.

Fig. 12 is an elevation of a further modified form of blade.

Fig. 13 is a plan view of one of the pinions whose shaft carries a blade.

Fig. 14 is an outline view of a tractor with the improved traction members in position.

Fig. 15 is a perspective view of the central disk supporting the shafts of the pinions carrying the blades.

Fig. 16 is an end elevation showing such central disk in position and cooperating parts in connected relation thereto.

Fig. 17 is an edge view of the disk shown in Fig. 15.

Fig. 18 is a perspective view of the central disk in closed form.

Fig. 19 is a sectional view of a detail, partly broken out.

Fig. 20 is a more or less diagrammatic elevation of a modified form for withdrawing the blades from operative positions.

One of the main conditions—if not the most important—of agricultural tractors is to firmly adhere to the ground at any time and on any ground. In the case of hard and even grounds, the adherence will be sufficient if wheels of sufficient width and size are used; but on grounds to be ploughed up, such wheels will generally be insufficient and my invention aims to substitute (momentarily when moving on such grounds), therefor driving members such as blades which are carried by the wheels and successively engage the ground as the wheels are rotating, thus forming a number of abutments securing perfect and continuous adherence of the tractor on the ground.

In order to practically, reliably and perfectly secure the engagement of said blades and cause the same to be forced into the ground and withdrawn from the same with a minimum expense of power, it will be necessary that said blades be forced in and withdrawn vertically and remain vertical during their contact with the ground; or more exactly that they continuously extend at right angles to the ground. Briefly stated it will be important that all the blades (or similar equivalent members) remain parallel in all positions notwithstanding the movement of the wheel or wheels carrying them.

This essential feature is obtained by my invention in a very single way and may be disclosed as follows:

1 designates (Fig. 1) a wheel or disc loosely mounted on a non-rotatable shaft having at its outer end a relatively fixed pinion 2. 3 is a toothed pinion fixed on a shaft located in close proximity to the periphery of the disc 1 carrying said shaft.

4 is another pinion loosely mounted on a shaft carried by the disc 1 and meshing with the pinions 2 and 3. It will be seen that if the whole arrangement is moved through a complete revolution around the imaginary central axis, the intermediate wheel 4 carried away by the disc 1 will roll on the fixed pinion 2 and thus cause the pinion 3 to make a complete revolution in a direction opposite to that of the disc. The pinion 3 will remain stationary in its plane.

By the addition of a second disc or wheel 5' to the disc 1 through the use of an intermediate sleeve 6, there is provided a spool-like device having flanges provided by the discs 1 and 5' and a body provided by the sleeve 6. This spool-like device is adapted to rotate freely on the shaft of the central pinion 2.

If the shaft of the pinion 3 is extended to have the same also supported by the disc 5' and there be secured to said shaft a blade 7 in any desired plane, the direction of said blade will always remain constant without regard to the rotations of the discs 1 and 5' on the shaft of the pinion 2.

The blade 7 being secured in a vertical plane, if the apparatus runs on the ground, the blade 7 will engage the ground and be forced into and again withdrawn from the same vertically.

It will be obvious that the same operation will take place for all blades which may be mounted on the shafts of the pinions 3, and arranged along the periphery of the discs 1 and 5, provided the pinions 3 are all in mesh with pinion 4.

Figs. 3 and 4 illustrate the possible arrangement of eight blades 7; the eight pinions 3 are extended and one or two of them (the upper one in the example) is in mesh with the pinion 4. The pinion 22 is extended by a plain or sleeve portion 22', on which is loosely mounted a gear 8 meshing with all the extended pinions 3, for which it constitutes a driving rack (or better an intermediate pinion imparting to the different pinions 3 the movement of the upper pinion 3 driven directly by pinion 4).

According to the length of the blades, a number thereof will be in engagement with the ground, three in the example.

However such anchoring in the ground may be insufficient because of the small number of blades. But as the length of the latter is limited as are also the sizes of the discs 1 (wheels) and 5, the invention makes use of means whereby the number of blades may be increased sufficiently.

To this end, two traction wheels, each comprising a disc 1 and a disc 5, have their discs 5 united by appropriate securing means in order to form a unitary traction wheel comprising two outer discs 1 and a central disc 5' made up of the connected discs 5 of the central traction wheels. In this arrangement, the two traction wheels are displaced with relation to each other by 1/16 of revolution. Thus I obtain eight blades at the right and eight blades at the left, alternating in the central disc 5'; right, left, right, etc., and acting like sixteen blades, the length of which would have normally permitted the arrangement of eight blades only on the wheel. This special arrangement has been termed above "bi-lateral."

It will be obvious that the two flanges joined together will form a single flange 5' in practice, provided with 16 holes.

The three flanges 1—5'—1 are connected by means of two sleeves or spool bodies 6 (Fig. 6), connecting the whole by means of rivets and bolts. Thus I obtain a double spool with 3 flanges, loosely rotating on the stationary shaft.

The practical embodiment of the tractor member thus disclosed may be designed in various ways. One preferred embodiment is illustrated in Figs. 8 to 22.

10 is the shaft supporting the whole mechanism. Said shaft supports the chassis 17' secured thereto by means of nuts 12; the front of said chassis-frame is connected to the engine (not shown) and the rear thereof carries a cross piece 16 provided with three attachments 16' for the connection of the implement or machine to be moved.

Within the chassis-frame each end of the shaft 10 has an elongated sleeve 22, the end portion of which is toothed (gear-wheel 2 in Figs. 1–7) whilst the remaining portion thereof is plain. Each sleeve has a lever 15 attached in flat position to the beam of the chassis by means of screws 15'.

At the central part of the shaft 10 carries the loose disc 5′ intended to support the shafts of the pinions 3. The arrangement being symmetrical on either side of the disc 5′ I have, for sake of clearness in the drawings, illustrated the right hand part in section below the shaft 10, in elevation above said shaft, all the pinions 3 but one being supposed to be omitted, and in elevation for the left hand part (only one of the pinions 3 being shown in section).

Loosely mounted on the shaft 10 is the flange 1 having eight holes for the reception of the shafts of the pinions 3. Vertically mounted between this flange 1 and the disc 5′ are the blades 7 on the shafts of the pinions 3.

The upper pinion 3 first meshes with the intermediate gear-wheel 4, driven by the toothed portion of the sleeve 22. The shaft of said wheel 4 is carried by the flange 1 and a spider shaped bridge 1′. The upper pinion 3 by its extension drives the gear 8 loosely mounted on the plain portion of the sleeve 2 and transmitting movement to the other pinions 3. Fig. 6 shows two pinions 4 one of which actuates the upper pinion 3, whilst the other actuates the lower pinion 3.

The flange 5′ is connected to the flange 1 by means of a sleeve 6 constituting a spool as described with reference to Fig. 4. 6″ designates the bolts and rivets connecting the parts of said spool.

The flange 1 along its periphery has eight standards 30 (Fig. 17), each of which has a lateral terminal flange 31 formed with an opening for the passage of a bolt. Riveted to the back of said standards is a rim 18 (Fig. 8) on which is fixed a cover 20 by means of bolts passing through the holes in the flanges 31. Said cover carries the sprocket pinion 21 of the chain extending to the driving pinion 38 (Fig. 14) of the engine.

As the arrangement is double, I obtain a tractor member in which the blades remain always vertical and the driving parts of said blades are completely housed in a tight case, adapted to contain oil introduced through 26 and lubrication being caused through the holes 23.

As already mentioned above, the central flange 5 has 16 holes for shafts of pinions 3 (Fig. 18), the eight hatched holes 32 serving for instance for the right hand shafts of pinions 3 and the others 32′ for the left hand shafts of pinions 3. In order to make the case tight, the flanges of the spools 6 will be riveted (or soldered) onto the outer periphery of the disc 5′ and the central periphery whereby the construction shown in Figs. 14 and 18 will be obtained. The spokes of said wheel will therefore be housed within the tight case.

The blades 7 are made of a shape adapted to be varied according to the use of the tractor. In an agricultural tractor, they may be made of the shape shown in section and elevation in Figs. 7 and 8. They may also be made in the shape of rakes with shorter teeth (Fig. 9) in the case of a tractor intended to move forwardly on icy surfaces. For instance, for the conveyance of wood on frozen rivers. Moreover both shapes may be combined to form members of a single piece (Fig. 10) being rake-shaped on one side of the shaft of the pinion 3 and blade-shaped on the opposite side. Preferably said combined blade and rake has one end shaped as in Fig. 11, the rake portion being inclined outside the plane of the blade portion.

The blade or combined blade and rake may be replaced by a strong dibble-like pike 33 (Fig. 12) leaving a toothless space 34 in the centre of the rake in order to give the dibble a sufficient length.

If the described tractor member is intended to move on roads for instance, the screws 15′ will be removed and the levers 15 turned down upon the rear part 17′ of the chassis-frame, where they will be attached by means of screws 15″. Owing to this movement all the blades will be moved through half a revolution and the tractor member will rest on the ground by the rim 18. The latter may of course be designed to receive a pneumatic or other tyre. When using a combined blade and rake, the levers 15 should be adapted to be fixed in three positions in order to move the shafts of the pinions 3 through a quarter or half a revolution, if the tractor member is to be drawn in or the rake or blade portions are to be used.

On the other hand, the independence of the pinions 3 respectively located on the right and left hand sides of the disc 5′, enables one of the levers 15 only to be actuated to cause the tractor member to be swung.

Fig. 14 shows diagrammatically the connection of the tractor member to the engine 36; 35 is the driver's seat.

The withdrawal of the blades may also be effected in the manner shown in Figs. 14 and 20, in which an endless screw 37 meshes with the outer toothed end of the sleeve 2, the arm 15 of which is avoided. The reversing may be effected from the right and left hand sides of the driver's seat.

The practical embodiment illustrated does not at all limit my invention; the bridge 1′ may for instance be omitted and the intermediate wheels 4 loosely mounted on a fixed shaft riveted to the flange 1, without departing from the spirit of the invention.

Again the whole structure may be secured to the central shaft, then journaled in bearings provided in the frame 17 independent from said central shaft.

For sake of simplification I may also arrange in the central disc 5′ a single gear 8 meshing directly with the ends of the shafts of all pinions 3. Thus on the right and left hand sides there should be two pinions 3 only in mesh with the wheels 4 or even a single pinion 4 would be sufficient with a single sleeve 2; the withdrawal of the blades would then be effected from one side only and by a single operation of the lever.

In big constructions in which the wheel diameter reaches and exceeds 1.50 meter, the bi-lateral arrangement will not be necessary, the periphery of the wheel being sufficient to arrange a great number of shafts without affecting the useful length of the blades, rakes and the like.

For instance in a wheel having a diameter of 2 meters, I will obtain 20 blades arranged at distances of 30 centimeters from each other and having a useful length of 25 centimeters.

It will be obvious that in such constructions the two intermediate wheels 4 will be arranged within a case and the rack 8 meshing with the pinion like ends 3 of the shafts within another case, the central wheel 5' being omitted.

Having now fully described my said invention, what I claim and desire to secure by Letters Patent, is:

1. In a tractor the combination of a stationary shaft, a gear mounted on the shaft as a center, a disc loosely mounted on said shaft, means for actuating said disc from the engine, a plurality of pinions uniformly distributed on the periphery of said disc, a toothed wheel arranged between said gear and one of the last mentioned pinions, and the shaft of which is supported by said disc, vertical blades arranged on the shafts of the last mentioned pinions in such a way that they project from the periphery of said disc, and a loose gear for transmitting movement from that pinion engaged by the toothed wheel to the last mentioned pinions, substantially as set forth.

2. In a tractor the combination of a stationary shaft, a gear mounted on the shaft as a center, a disc loosely mounted on said shaft, means for actuating said disc from the engine, a plurality of pinions uniformly distributed on the periphery of said disc, a toothed wheel arranged between said gear and one of the last mentioned pinions, and the shaft of which is supported by said disc, vertical blades arranged on the shafts of the last mentioned pinions in such a way that they project from the periphery of said disc, and a loose gear for transmitting movement from that pinion engaged by the toothed wheel to the last mentioned pinions, means for rigidly connecting said stationary shaft to the frame of the tractor, a lever carried by said shaft and adapted to be turned downwardly, substantially as and for the purpose set forth.

3. In a tractor the combination of a stationary shaft, a gear mounted on the shaft as a center, a disc loosely mounted on said shaft, means for actuating said disc from the engine, a plurality of pinions uniformly distributed on the periphery of said disc, a toothed wheel arranged between said gear and one of the last mentioned pinions, and the shaft of which is supported by said disc, vertical blades arranged on the shafts of the last mentioned pinions in such a way that they project from the periphery of said disc, and a loose gear for transmitting movement from that pinion engaged by the toothed wheel to the last mentioned pinions, means for rigidly connecting said stationary shaft to the frame of the tractor, two levers carried by said shaft and adapted to be turned downwardly, substantially as and for the purpose set forth.

4. In a tractor the combination of a stationary shaft, a gear mounted on the shaft as a center, a disc loosely mounted on said shaft, means for actuating said disc from the engine, a plurality of pinions uniformly distributed on the periphery of said disc, a toothed wheel arranged between said gear and one of the last mentioned pinions, and the shaft of which is supported by said disc, vertical blades arranged on the shafts of the last mentioned pinions in such a way that they project from the periphery of said disc, and a loose gear for transmitting movement from that pinion engaged by the toothed wheel to the last mentioned pinions, a gear wheel on said shaft and a worm engaging said gear-wheel, substantially as and for the purpose set forth.

5. In a tractor the combination of a stationary shaft, a gear mounted on the shaft as a center, a disc loosely mounted on said shaft, means for actuating said disc from the engine, a plurality of pinions uniformly distributed on the periphery of said disc, a toothed wheel arranged between said gear and one of the last mentioned pinions, and the shaft of which is supported by said disc, vertical blades arranged on the shafts of the last mentioned pinions in such a way that they project from the periphery of said disc, and a loose gear for transmitting movement from that pinion engaged by the toothed wheel to the last mentioned pinions, a case enclosing all the pinions, and a toothed pinion carried by said case and actuated by the engine, a spool-shaped case to which said disc is joined by either face, and means for connecting said case to the pinion containing case, substantially as and for the purpose set forth.

6. In a tractor, the combination of a stationary shaft, a stationary sleeve around a portion of said shaft, a disc loosely mounted on another portion of said shaft, a toothed portion of said sleeve acting as a complete pinion, a plurality of pinions uniformly distributed on the periphery of said disc, an intermediate gear wheel arranged between said toothed portion of said sleeve and one of the last mentioned pinions, the shaft of said gear wheel being supported by said disc, vertical blades arranged on the shafts of the last mentioned pinions in such a way that they project from the periphery of said disc, another gear wheel loosely mounted on the non-toothed portion of said sleeve and meshing with all the last mentioned pinions, a cover and a rim secured to the said disc over all said pinions and gears, and means for actuating said disc by the engine.

In testimony whereof I have hereunto set my hand.

CHARLES BOUCHÉ.